July 2, 1940.  P. CUSHNIE  2,206,766
MEANS FOR FEEDING IRREGULAR OBJECTS TO A CONVEYER
Filed Nov. 17, 1937  2 Sheets-Sheet 2

INVENTOR
PETER CUSHNIE
BY
Joseph H. Lipschutz
ATTORNEY

Patented July 2, 1940

2,206,766

UNITED STATES PATENT OFFICE 2,206,766

MEANS FOR FEEDING IRREGULAR OBJECTS TO A CONVEYER

Peter Cushnie, White Plains, N. Y., assignor to Sperry Products, Inc., Brooklyn, N. Y., a corporation of New York Application November 17, 1937, Serial No. 174,947

2 Claims. (Cl. 198—25)

This invention relates to a method and means for feeding objects to conveying or propelling mechanism and is especially designed to feed objects having an irregular cross-section. It is difficult to feed said objects continuously to a conveyer in such manner that the objects occupy a given position on the conveyer so that they may be transported in said position to the next operating station. This invention is illustrated specifically in connection with feeding steel rails to a conveyer designed to carry said rails to a welding machine as disclosed in the pending patent application of G. L. Jones and C. B. Roede, Serial No. 169,222, filed October 15, 1937, for Method and means for welding rails. Nevertheless, it will be obvious from the following description of the invention that it has general applicability to all similar cases wherein objects having an irregularly shaped cross-section must be delivered to a conveyer in predetermined position.

Further objects and advantages of this invention will become apparent in the following description thereof.

In the accompanying drawings.

Figure 1:
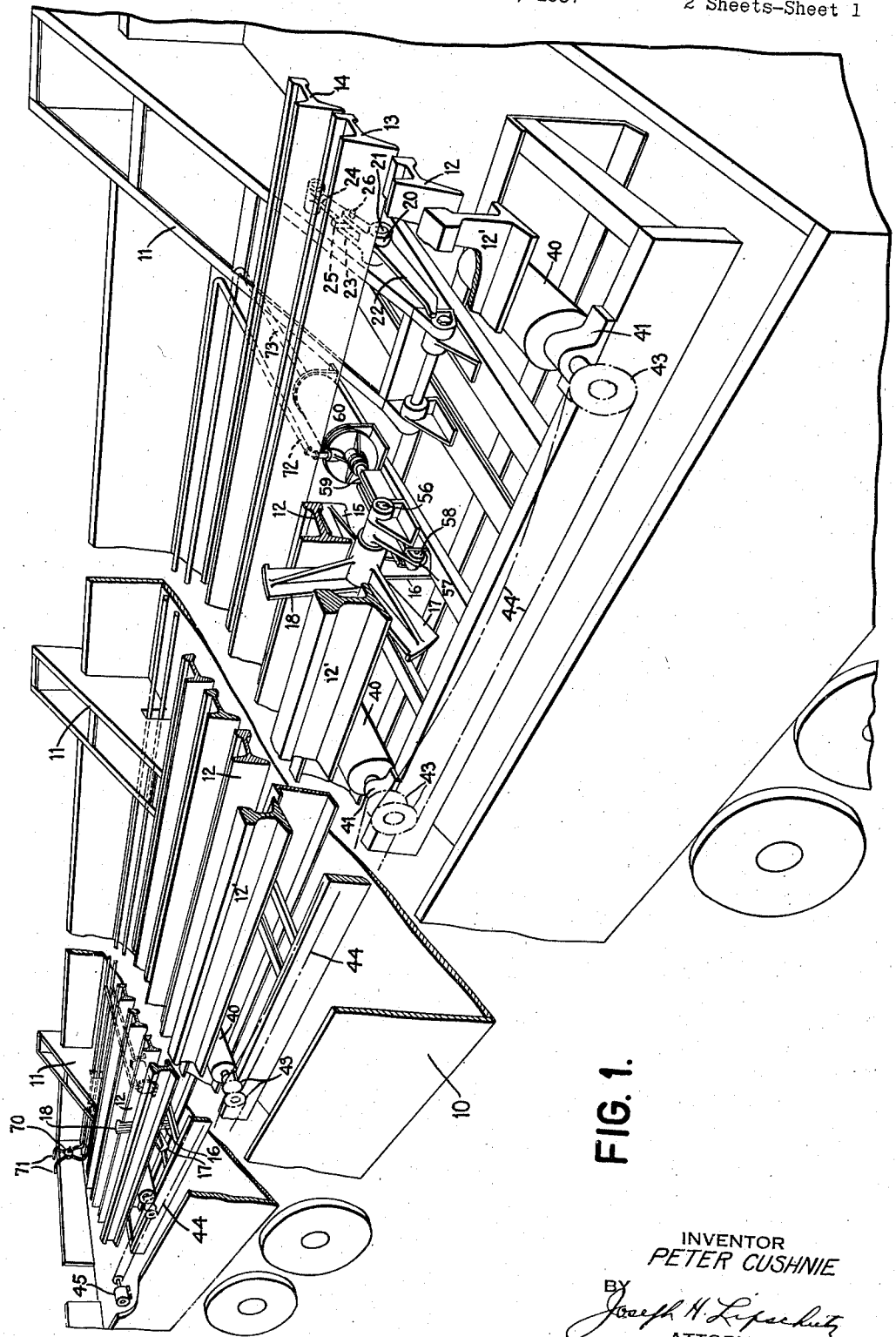
Fig. 1 is a perspective view of the feeding mechanism mounted on a rail car.

Referring to the drawings, I have shown my invention applied to a rail car, because the form of the invention herein disclosed is particularly adapted for use in connection with the mobile rail welding train disclosed in the said patent application of Jones and Roede, but it will readily become apparent as the description proceeds that the car is not essential and that the mechanism may be mounted on a fixed base. Further, it will become apparent that although the description applies specifically to steel rails, that the invention has applicability to other objects having different irregular cross-section. In this case, however, the device is shown as mounted on a flat car 10 having a series of inclines 11 lengthwise thereof, down which a supply of rails is adapted to be delivered. Thus, a crane or similar object may lift the rails above the top of the inclines 11 and deposit the same on said inclines so that they may drop by gravity to the lowermost point permitted by the mechanism. The rails are deposited upon the inclines on their sides, as shown at 12, 13 and 14, and will slide downwardly until the first of the rails rests upon a horizontal arm 15 of a star wheel which in the present case comprises four such arms 15, 16, 17, 18. A plurality of such star wheels are provided lengthwise of the car, in the present instance, two being shown. The lowermost rail 12 will rest upon the horizontal arms 15 of the star wheels. In order to prevent more than one rail from resting upon the horizontal arms 15 as the rails slide down the inclines, there may be provided a detent mechanism which consists of a lever 20 pivoted at 21 and having a forwardly projecting arm 22 and a rearwardly projecting arm 23. The latter arm is pivotally connected to a lever 24 having an upwardly projecting detent or tongue 25 at its forward end substantially in vertical alignment with the pivot 26 between arm 23 and arm 24. A tension spring 30 normally pulls downwardly upon arms 23 and 24 to maintain the detent 25 below the surface of incline 11, so that the first rail 12 is free to slide thereover without being obstructed by the detent 25. As the rail 12 rides upon the arm 15 it also rests upon arm 22 to swing said arm downwardly around pivot 21 to cause the detent 25 to rise against the action of tension spring 30. The parts are of such proportions that the detent 25 will be lifted after the base 31 of rail 13 has passed said detent and before the head 32 of rail 13 has reached the detent. Therefore the detent will be raised in time to catch beneath the head 32 of the succeeding rail 13 and hold the same against further downward movement. A plurality of such detents are provided along the length of the rail. The remaining rails 14, etc., slide down until they touch each other, the supply of rails being held back by the detent 25.

The single rail 12 resting upon the arms 15 of the star wheels is now in position to be delivered to the conveyer or propelling mechanism. In this instance the propelling mechanism may comprise a plurality of power driven rollers 40 journaled in brackets 41 upon a frame 42 mounted on the base of car 10, the shafts of said rollers 40 having sprocket wheels 43 fixed thereto from which operate chains 44 driven from a motor 45 at one end of the car. When the motor 45 is operating, the series of chain and sprocket drives is set in motion to cause rollers 40 to rotate, and any object resting upon said rollers will be fed along said rollers to the next operating position.

Figure 2:
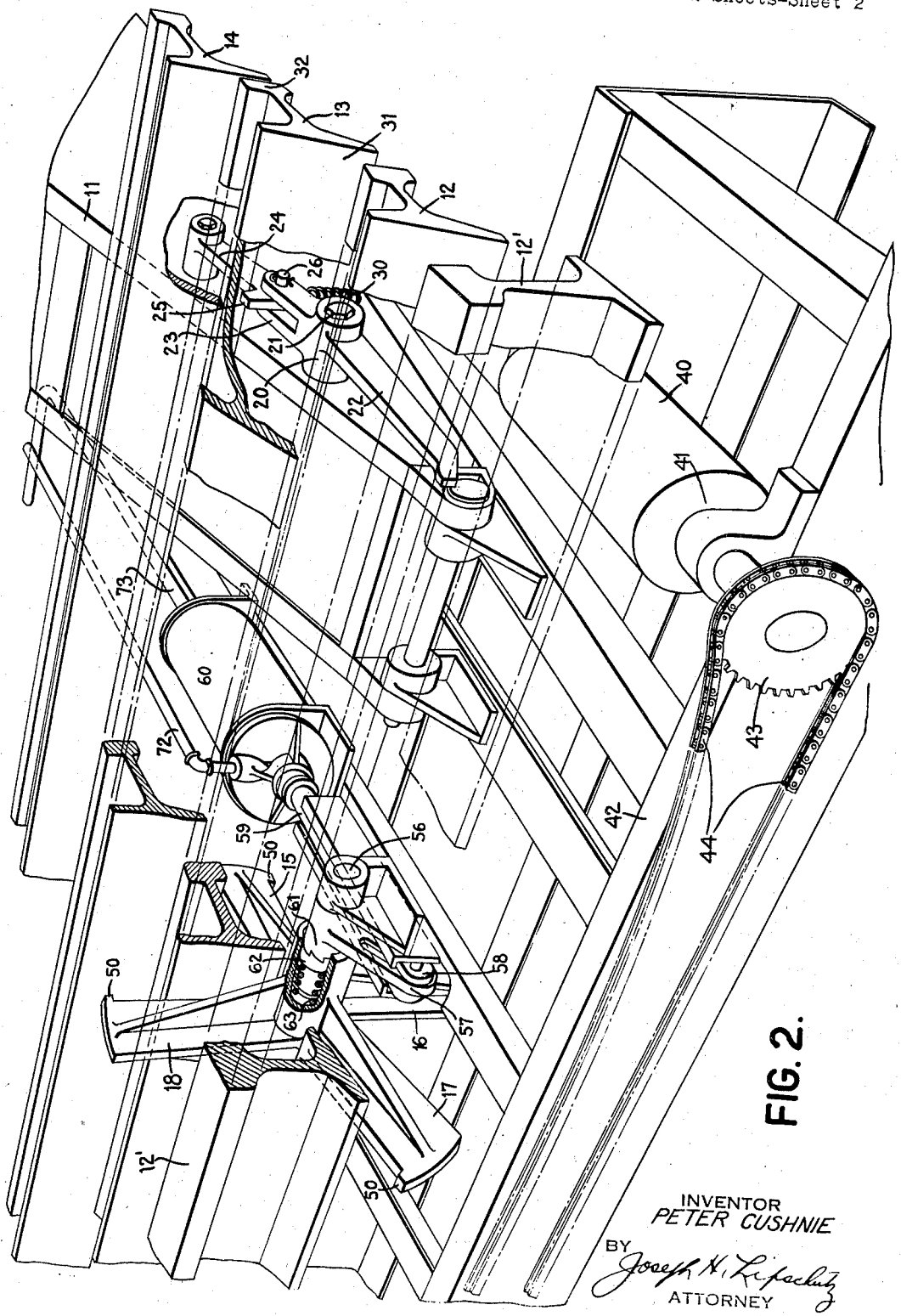
Fig. 2 is an enlarged perspective of a portion of the mechanism shown in Fig. 1.

For delivering the rails successively to the rollers 40, the said wheels are operated through a quarter turn, since there are four arms to each star wheel. By rotating the star wheels a quarter turn, it will be seen that the rail 12 will be turned up into upright position by the time arms 15 have reached the vertical position. By this time, arms 18 will have reached the horizontal position so that the base of rail 12 rests thereon and the said rail is in the vertical position shown in Fig. 2 at 12'. The position of the star wheel remains such that arm 18 moves somewhat below the horizontal position to be out of the way after said rail is deposited upon the rollers 40. Detents 50 on the ends of the star wheel arms prevent the rail from sliding off said arms before the rail has been deposited on the rollers 40.

For operating the star wheel arms through quarter turn steps, so that the rail 12 may be positioned in upright position as shown at 12', there may be provided on each shaft 56 of the star wheels an arm 57 engaging in a fork 58 forming the end of a piston rod 59 connected to a piston operating within a fluid pressure cylinder 60. When the piston is moved rearwardly in the view shown in Fig. 2, arm 57 will be rocked in a direction to rotate the star wheel so as to move arm 15 to vertical position and arm 18 to horizontal position. The parts are so designed that the movement of the piston to which piston rod 59 is connected, is sufficient to rotate the star wheel through a quarter turn. The piston and the piston rod 59 are then returned to original forward position without, however, rotating the star wheel backwards, by reason of the ratchet connection 61, 62, part 61 being fixed to arm 57 and part 62 being splined to the star wheel so that part 61 may rotate backwards without rotating part 62 but merely moving the same axially against the action of a spring 63. Brake means (not shown) may be continuously applied to the star wheel to prevent over-running.

As the rail 12 is carried to operating position by the rotation of the star wheel, the weight of said rail is taken off arm 22, thus permitting tension spring 30 to withdraw detent 25 and allow rail 13 to slide down until it rests upon arms 16 of the star wheels which arms have now reached the horizontal position. As soon as rail 13 rests upon arms 16 it also rests upon arms 22, causing the detents 25 to be lifted so that they engage beneath the heads of rail 14 which has now slid down the incline along with all the rails positioned above rail 14 on the incline.

For controlling the pistons within cylinders 60, there may be provided a fluid pressure control valve 70 controlling a supply of fluid pressure, which may be compressed air from the compressed air line, entering by connection 71 and delivering the same to the cylinders 60 at each end by connections 72, 73, so that the pistons within cylinders 60 are power driven in each direction. The valve 70 may be controlled by the same operator who controls the operation of motor 45, or motor 45 may be separately controlled by the operator at the next operating station, so that the latter operator may determine when the rail in position on the rollers is to be delivered to the next operating station.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a device of the character described, a mechanism for propelling objects in a horizontal plane, star-wheel mechanism for delivering the objects to said propelling mechanism, means for feeding objects by gravity substantially into said plane and into engagement with said star-wheel mechanism, means actuated by an object when said object engages said star-wheel mechanism for interrupting feeding of the succeeding objects by gravity, and means for rotating said star-wheel mechanism through predetermined angular steps, rotation of said star-wheel mechanism through each step being adapted to deliver an object to said propelling mechanism.

2. In a device of the character described, a mechanism for propelling objects in a horizontal plane, star-wheel mechanism for delivering the objects to said propelling mechanism, means for feeding objects by gravity substantially into said plane and into engagement with said star-wheel mechanism, means actuated by an object when said object engages said star-wheel mechanism for interrupting feeding of the succeeding objects by gravity, means for rotating said star-wheel mechanism through predetermined angular steps, rotation of said star-wheel mechanism through each step being adapted to deliver an object to said propelling mechanism, and means whereby said interrupting means is rendered inoperative when said star-wheel mechanism rotates.

PETER CUSHNIE.